(12) United States Patent
Hatori et al.

(10) Patent No.: US 12,233,792 B2
(45) Date of Patent: Feb. 25, 2025

(54) IN-VEHICLE DEVICE AND CONTROL METHOD

(71) Applicant: TOYOTA JIDOSHA KABUSHIKI KAISHA, Toyota (JP)

(72) Inventors: Takayuki Hatori, Nagakute (JP); Takuma Katoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 17/895,195

(22) Filed: Aug. 25, 2022

(65) Prior Publication Data

US 2023/0080505 A1 Mar. 16, 2023

(30) Foreign Application Priority Data

Sep. 16, 2021 (JP) ................................ 2021-151515

(51) Int. Cl.
| | |
|---|---|
| *B60R 16/03* | (2006.01) |
| *B60R 16/023* | (2006.01) |
| *G06F 3/16* | (2006.01) |
| *H02J 7/00* | (2006.01) |

(52) U.S. Cl.
CPC ............ *B60R 16/03* (2013.01); *B60R 16/023* (2013.01); *G06F 3/165* (2013.01); *H02J 7/0063* (2013.01)

(58) Field of Classification Search
CPC ....... B60R 16/03; B60R 16/023; G06F 3/165; H02J 7/0063
USPC .................................................. 307/9.1–10.8
See application file for complete search history.

(56) References Cited

U.S. PATENT DOCUMENTS

| | | | | |
|---|---|---|---|---|
| 10,759,366 B2* | 9/2020 | Aoyagi | .................. | B60N 2/002 |
| 2004/0249534 A1* | 12/2004 | Yamada | ................ | B60R 25/209 |
| | | | | 701/532 |
| 2018/0149681 A1* | 5/2018 | Chakrabarty | ............. | H02J 9/06 |

FOREIGN PATENT DOCUMENTS

| | | |
|---|---|---|
| FR | 2 770 303 A1 | 4/1999 |
| JP | 2003-301764 A | 10/2003 |
| JP | 2005-349900 A | 12/2005 |
| JP | 2008-168740 A | 7/2008 |
| JP | 2021-133833 A | 9/2021 |

* cited by examiner

*Primary Examiner* — Hal Kaplan
*Assistant Examiner* — Terrence R Willoughby
(74) *Attorney, Agent, or Firm* — Oblon, McClelland, Maier & Neustadt, L.L.P.

(57) ABSTRACT

An in-vehicle device that provides a predetermined function to a passenger of a vehicle, the in-vehicle device comprises an operation element that is a hardware interface; and a controller comprising at least one processor configured to perform output a signal for supplying power to an accessory power supply system of the vehicle, in a case where operation is performed on the operation element.

14 Claims, 10 Drawing Sheets

IN-VEHICLE DEVICE AND CONTROL METHOD

CROSS REFERENCE TO THE RELATED APPLICATION

This application claims the benefit of Japanese Patent Application No. 2021-151515, filed on Sep. 16, 2021, which is hereby incorporated by reference herein in its entirety.

BACKGROUND

Technical Field

The present disclosure relates to power supply control of a vehicle.

Description of the Related Art

In recent years, a vehicle in which a system is started by a push button switch has been in widespread use.

Concerning this, for example, Japanese Patent Laid-Open No. 2003-301764 discloses an invention regarding a vehicle in which an engine is started, and power is supplied by utilizing a push button switch.

SUMMARY

The present disclosure is directed to improving user-friendliness of a user who gets in a vehicle.

The present disclosure in its one aspect provides an in-vehicle device that provides a predetermined function to a passenger of a vehicle, the in-vehicle device comprising: an operation element that is a hardware interface; and a controller comprising at least one processor configured to perform output a signal for supplying power to an accessory power supply system of the vehicle, in a case where operation is performed on the operation element.

The present disclosure in its another aspect provides a control method for controlling a vehicle, the control method comprising: a step of acquiring operation on an operation element provided at an in-vehicle device, the operation element being a hardware interface, the in-vehicle device providing a predetermined function to a passenger of the vehicle; and a step of outputting a signal for supplying power to an accessory power supply system of the vehicle, in a case where operation is performed on the operation element.

Further, another aspect includes a program for causing a computer to execute the control method described above or a computer-readable storage medium in which the program is non-temporarily stored.

According to the present disclosure, it is possible to improve user-friendliness of a user who gets in a vehicle.

BRIEF DESCRIPTION OF THE DRAWINGS

FIG. 4A is a diagram for explaining transition of a power supply mode upon getting-in;

FIG. 4B is a diagram for explaining transition of a power supply mode upon getting-in;

DESCRIPTION OF THE EMBODIMENTS

Figure 1:
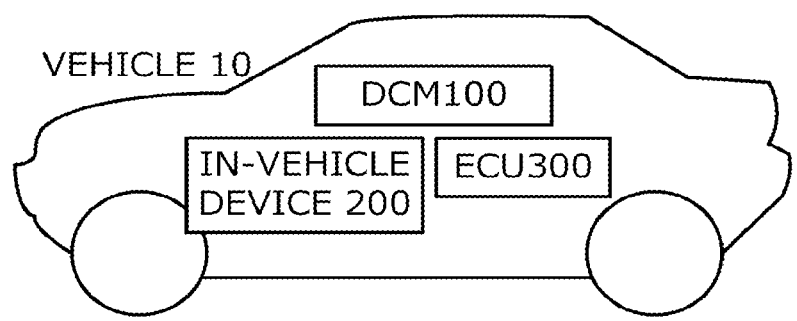
FIG. 1 is a schematic diagram of a vehicle system according to a first embodiment.

In a typical automobile, three types of modes of a mode in which a power supply is shut down, a mode in which solely an accessory power supply system is powered on, and a mode in which all power supply systems are powered on are used as power supply modes. The accessory power supply system is a power supply system for activating peripheral equipment that is not directly related to traveling of a vehicle. Typically, these types of power supply systems are started in a case where operation (ignition operation) of starting a vehicle system is performed.

On the other hand, there is a demand for utilizing an electric component (for example, a multimedia terminal) provided at a vehicle without causing the vehicle to travel. In such a case, it is necessary to start a vehicle system while designating a mode in which power is supplied only to an accessory power supply system. However, operation for supplying power only to the accessory power supply system is different from normal starting operation, which causes a problem that the operation involves cumbersomeness for a user.

An information processing device according to the present disclosure solves such a problem.

An in-vehicle device according to one aspect of the present disclosure is an in-vehicle device that provides a predetermined function to a passenger of a vehicle, the in-vehicle device including an operation element that is a hardware interface, and a controller comprising at least one processor configured to perform output a signal for supplying power to an accessory power supply system of the vehicle in a case where operation is performed on the operation element.

The in-vehicle device is a device that is mounted on a vehicle and provides a predetermined function to a passenger. The in-vehicle device is typically referred to as a car navigation device, a multimedia terminal, an infotainment terminal, a head unit, or the like. The predetermined function is, for example, a car navigation function, a music reproduction function, a moving image reproduction function, a network function, a TV/radio function, or the like. These functions are, for example, implemented by software.

The in-vehicle device includes an operation element that is a hardware interface. The operation element is, for example, a push button for requesting the in-vehicle device to provide these functions. In a case where the functions are implemented by software, the software may be activated in response to operation performed on the operation element. The operation element may be disposed in the vicinity of a display device (screen) provided at the in-vehicle device.

The in-vehicle device according to the present embodiment detects that operation is performed on such an operation element and outputs a signal for supplying power to the accessory power supply system of the vehicle. For example, in a case where the user performs operation on the operation element while the vehicle system is stopped, the in-vehicle device supplies an operation signal to a power supply relay for supplying power to the accessory power supply system of the vehicle.

Normally, the power supply relay supplies power to the accessory power supply system in coordination with operation on a main switch. In contrast, in the present embodiment, by the in-vehicle device supplying a signal that gives an instruction to supply power to the accessory power supply system to the power supply relay, it is possible to supply power to the accessory power supply system without using the main switch. In other words, the in-vehicle device can be powered on by operation being performed on the operation element provided at the in-vehicle device. This enables start of utilization of the in-vehicle device by more intuitive operation.

Note that in a case where the accessory power supply system has already been powered, the operation element can function as an interface for activating (or terminating) a predetermined function as in related art.

Specific embodiments of the present disclosure will be described below on the basis of the drawings. A technical scope of the disclosure is not intended to be limited to hardware configurations, module configurations, functional components, and the like, described in the respective embodiments unless noted otherwise.

First Embodiment

Outline of a vehicle system according to a first embodiment will be described with reference to FIG. 1. The vehicle system according to the present embodiment includes a vehicle 10.

The vehicle 10 is a connected car having a function of communicating with an external network. The vehicle 10 includes a data communication module (DCM) 100, an in-vehicle device 200, and an electronic control unit (ECU) 300. Note that while FIG. 1 illustrates a single ECU 300, the vehicle 10 may include a plurality of ECUs 300.

The DCM 100 is a device that performs wireless communication with an external network. The DCM 100 functions as a gateway that connects components provided in the vehicle 10 (hereinafter, vehicle components) to the external network. For example, the DCM 100 provides access to the external network to the in-vehicle device 200 and the ECU 300 provided in the vehicle 10. This enables the in-vehicle device 200 and the ECU 300 to communicate with external devices connected to a network via the DCM 100.

The in-vehicle device 200 is a device (for example, a car navigation device) that provides information to a passenger of the vehicle. The in-vehicle device 200 is also referred to as a car navigation device, an infotainment device, or a head unit. The in-vehicle device 200 allows navigation or entertainment to be provided to the passenger of the vehicle. The in-vehicle device 200 may download traffic information, road map data, music, a moving image, and the like, via the DCM 100.

Figure 2:
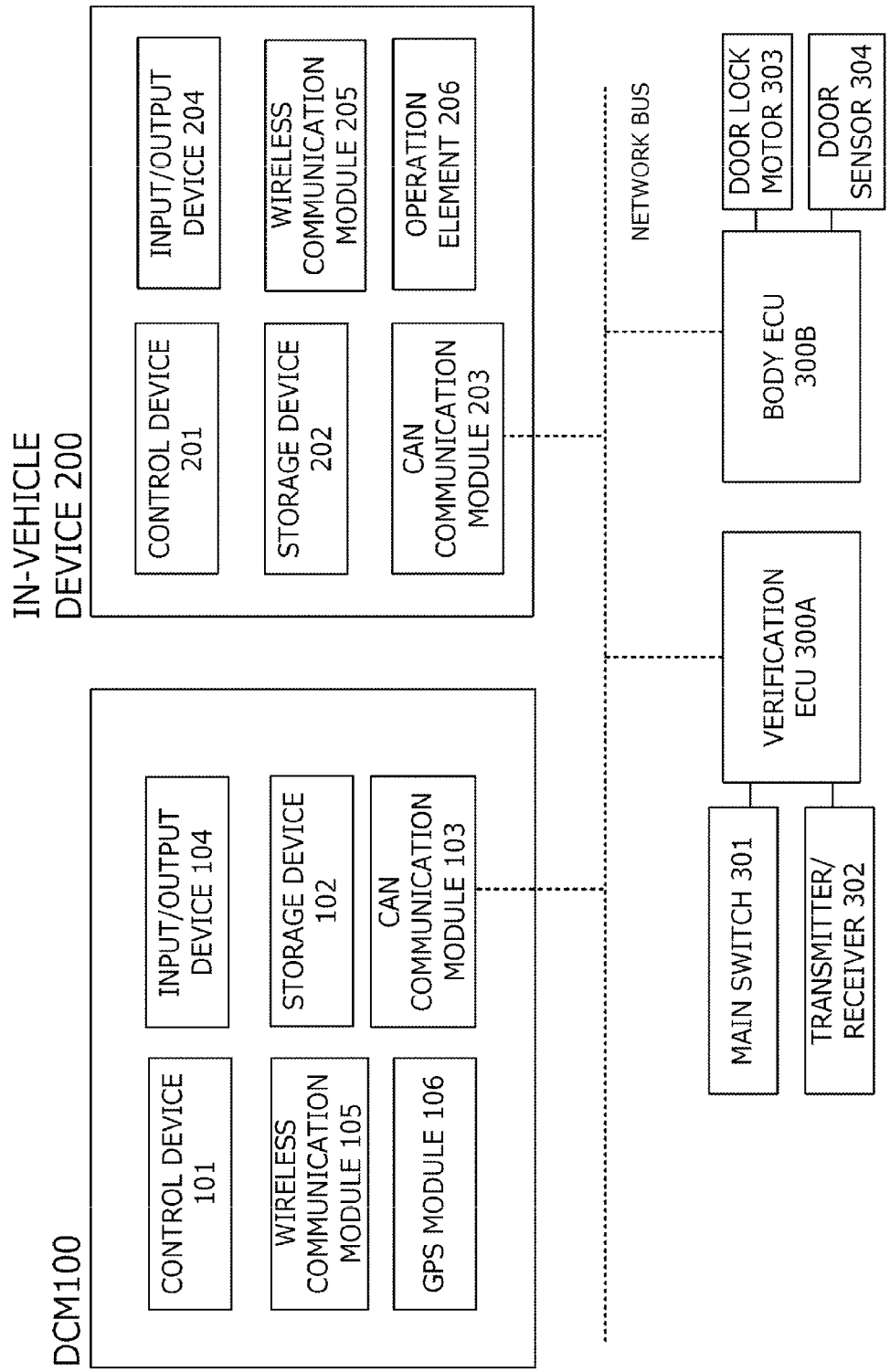
FIG. 2 is a diagram for explaining components provided in a vehicle according to the first embodiment.

FIG. 2 is a diagram for explaining components provided in the vehicle 10 according to the present embodiment. The vehicle 10 according to the present embodiment includes the DCM 100, the in-vehicle device 200, and a plurality of ECUs 300A, 300B, . . . (hereinafter, collectively referred to as the ECU 300).

The ECU 300 may include a plurality of ECUs that manage different vehicle components. Examples of the plurality of ECUs can include, for example, a body ECU, an engine ECU, a hybrid ECU, a power train ECU, and the like. Further, the ECU 300 may be divided in units of function. For example, the ECU 300 can be divided into an ECU that executes a security function, an ECU that executes an autonomous parking function, and an ECU that executes a remote control function.

In the present embodiment, as the ECU 300, a verification ECU 300A and a body ECU 300B are illustrated as examples. The verification ECU 300A is an ECU that manages security of the vehicle. The verification ECU 300A generates a signal that allows locking/unlocking of the vehicle and starting of the vehicle system by performing communication with a smart key (key fob) possessed by a user of the vehicle.

The body ECU 300B is an ECU that manages various kinds of components provided in a vehicle body. In the present embodiment, the body ECU 300B can lock/unlock a door of the vehicle 10 on the basis of the signal transmitted from the verification ECU 300A.

First, the DCM 100 will be described.

The DCM 100 includes a control device 101, a storage device 102, a CAN communication module 103, an input/output device 104, a wireless communication module 105, and a GPS module 106.

The control device 101 is an arithmetic unit that implements various kinds of functions of the DCM 100 by executing predetermined programs. The control device 101 may be implemented by, for example, a CPU, and the like.

The control device 101 executes a function of mediating communication to be performed between the external network and components provided in the vehicle 10 (vehicle components). For example, in a case where a certain vehicle component needs to communicate with the external network, the control device 101 executes a function of relaying data transmitted from the vehicle component to the external network. Further, the control device 101 executes a function of receiving data transmitted from the external network and transferring the data to an appropriate vehicle component.

Still further, the control device 101 can execute a function peculiar to the own device. For example, the control device 101 can execute a monitoring function and a call function of a security system and can issue a security notification, an emergency notification, or the like, on the basis of a trigger occurring inside the vehicle.

Here, functions to be executed by the control device 101 will be described. The control device 101 can execute functions that will be described below as examples. Each function can be implemented by the control device 101 executing a program stored in storage such as a ROM.

(1) Data Relay Function

The control device 101 can relay data to be transmitted/received between vehicle components. For example, the control device 101 executes processing of receiving a message transmitted by a first device connected to an in-vehicle network and transferring the message to a second device connected to the in-vehicle network as needed. The first and the second devices may be ECUs 300 or may be other vehicle components.

Further, in a case where the control device 101 receives a message addressed to an external network, from a vehicle component, the control device 101 relays the message to the external network. Further, the control device 101 receives data transmitted from the external network and transfers the data to an appropriate vehicle component.

(2) Emergency Notification Function

The control device 101 can issue an emergency notification to an operator outside the vehicle in a case where an abnormal situation occurs in the vehicle 10. Examples of the abnormal situation can include occurrence of a traffic accident or a vehicle malfunction. For example, in a case where a predetermined trigger such as depression of a call button provided inside the vehicle and deployment of an airbag occurs the control device 101 starts connection to the operator and enables call between the passenger of the vehicle and the operator. Note that upon emergency notification, the control device 101 may transmit position information of the vehicle to the operator. The position information of the vehicle can be acquired from the GPS module 106.

(3) Security Monitoring Function

The control device 101 can perform security monitoring processing. The control device 101 detects that the vehicle is unlocked without through approved procedure, for example, on the basis of data received from the ECU 300 that manages an electronic lock of the vehicle and transmits a security notification to a predetermined device. Note that the security notification may include position information of the vehicle. The position information of the vehicle can be acquired from the GPS module 106.

Note that while three types of functions are described as examples of functions to be provided by the DCM 100 here, the DCM 100 may provide functions other than these.

The storage device 102 is a memory device including a main memory and an auxiliary memory. In the auxiliary memory, an operating system (OS), various kinds of programs, various kinds of tables, and the like, are stored, and each function that matches a predetermined purpose as will be described later can be implemented by a program stored in the auxiliary memory being loaded to the main memory and executed.

The CAN communication module 103 is an interface unit for connecting the DCM 100 to the in-vehicle network. In the present embodiment, a plurality of vehicle components including the in-vehicle device 200 and the ECU 300 are connected to each other via a bus of the in-vehicle network. Examples of standards of the in-vehicle network can include, for example, a controller area network (CAN). Note that in a case where the in-vehicle network utilizes a plurality of standards, the CAN communication module 103 may include a plurality of interface devices that match standards of communication destinations. Examples of communication standards other than CAN can include, for example, Ethernet (registered trademark), and the like.

The input/output device 104 is a unit that inputs/outputs information. Specifically, the input/output device 104 includes a help button to be depressed in a state of emergency, a microphone, a speaker, and the like.

The wireless communication module 105 includes an antenna for performing wireless communication and a communication module. The antenna is an antenna element that inputs/outputs a wireless signal. In the present embodiment, the antenna is compatible with mobile communication (for example, mobile communication such as 3G, LTE and 5G). Note that the antenna may include a plurality of physical antennas. For example, in a case where mobile communication utilizing a radio wave in a high frequency band such as a microwave and a millimeter wave is performed, a plurality of antennas may be arranged in a distributed manner to achieve stabilization of communication. The communication module is a module for performing mobile communication.

The GPS module 106 includes a GPS antenna for measuring position information and a positioning module. The GPS antenna is an antenna that receives a positioning signal transmitted from a positioning satellite (also referred to as a GNSS satellite). The positioning module is a module that calculates position information on the basis of the signal received by the GPS antenna.

Note that the DCM 100 may be able to operate independently of other components provided in the vehicle 10. For example, the DCM 100 may be able to operate alone without an external power supply by incorporating an auxiliary battery. Such a configuration enables an emergency notification, or the like, to be issued even in a case where a malfunction (such as, for example, a malfunction in power feeding) occurs in other components of the vehicle 10 due to a traffic accident, or the like.

The in-vehicle device 200 will be described next.

The in-vehicle device 200 is a device that provides information to a passenger of the vehicle 10 and is also referred to as a car navigation system, an infotainment system, or a head unit. The in-vehicle device 200 can provide navigation or entertainment to the passenger of the vehicle. Further, the in-vehicle device 200 may have a function of downloading traffic information, road map data, music, a moving image, or the like, by performing communication with an external network of the vehicle 10. Still further, the in-vehicle device 200 may be a device that coordinates with a smartphone, or the like.

Further, the in-vehicle device 200 also functions as a front-end of the DCM 100. For example, when the DCM 100 executes predetermined processing (for example, emergency notification), the in-vehicle device 200 inputs/outputs information related to the processing (for example, displays a calling status of the operator).

The in-vehicle device 200 can be constituted as a computer including a processor such as a CPU and a GPU, a main memory such as a RAM and a ROM, and an auxiliary memory such as an EPROM, a hard disk drive and a removable medium. In the auxiliary memory, an operating system (OS), various kinds of programs, various kinds of tables, and the like, are stored, and each function that matches a predetermined purpose as will be described later can be implemented by a program stored in the auxiliary memory being executed. However, part or all of the functions may be implemented by a hardware circuit such as an ASIC and an FPGA.

The in-vehicle device 200 includes a control device 201, a storage device 202, a CAN communication module 203, an input/output device 204, a wireless communication module 205, and an operation element 206.

The control device 201 is an arithmetic unit that implements various kinds of functions of the in-vehicle device 200 by executing predetermined programs. The control device 201 may be implemented by, for example, a CPU, and the like.

Figure 3:
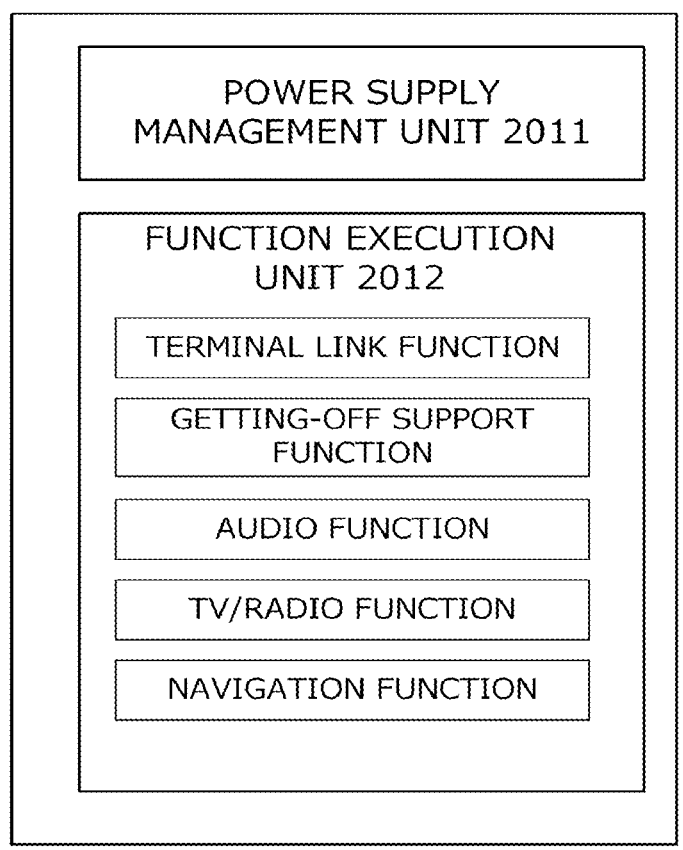
FIG. 3 is a schematic diagram for explaining functional modules provided at a control device 201.

FIG. 3 is a diagram illustrating a configuration of functional modules provided at the control device 201.

The control device 201 includes two functional modules of a power supply management unit 2011 and a function execution unit 2012. Each functional module may be implemented by the CPU executing a stored program.

The power supply management unit 2011 performs control regarding power supply.

Here, problems in related art and solutions in the present embodiment regarding power supply will be described. Note that in the following description, the accessory power supply system refers to a power supply system for causing peripheral equipment that are not directly related to traveling of the vehicle to operate. Power is supplied to the accessory power supply system, for example, while an engine is stopped. Further, the ignition power supply system refers to a power supply system to which power is supplied while the vehicle is operating (for example, the engine is operating). Power is supplied from the respective power supplies through power lines of different systems.

Further, in the following description, the power supply mode is a mode for supplying power to a plurality of vehicle components. The power supply mode in the vehicle in related art includes the following three types.

1. Parking mode
2. Accessary mode
3. Normal mode

The parking mode is a power supply mode in a state where the vehicle is parked, that is, a traveling system of the vehicle is shut down, and the door is locked. In the parking mode, power is not supplied to vehicle components except vehicle components to which power needs to be always supplied (such as, for example, a DRAM for memory backup, a DCM for wireless communication, and a module that performs CAN communication).

The accessory mode is a power supply mode in which power is supplied solely to the accessory power supply system. The mode can transition to the accessory mode, for example, by a user of the vehicle performing predetermined operation.

The normal mode is a power supply mode in which power is supplied to both the accessory power supply system and the ignition power supply system. In a case where the vehicle 10 is traveling, the power supply mode becomes the normal mode.

Figure 4:
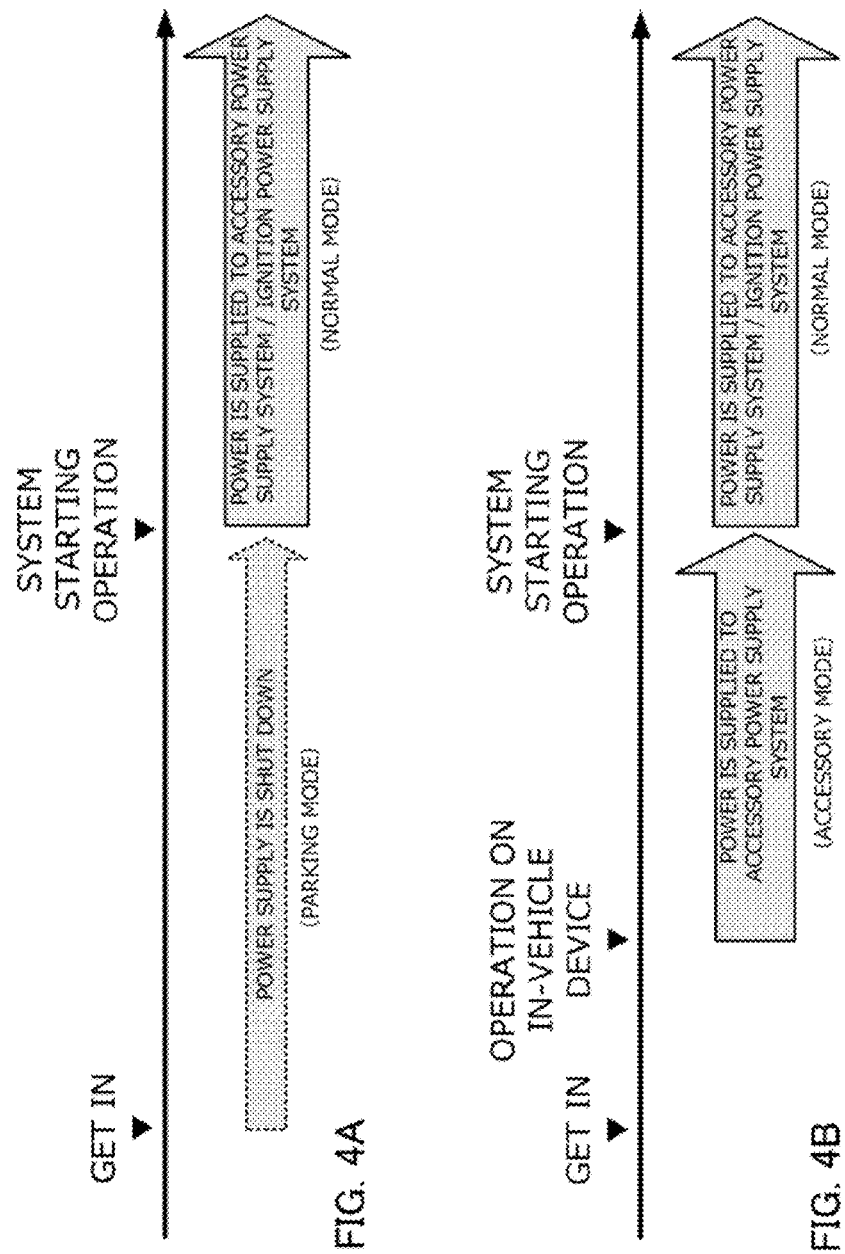

FIG. 4A is a diagram for explaining power supply control in the vehicle in related art. In the vehicle in related art, the power supply mode remains to be the parking mode from when the passenger gets in the vehicle until when the passenger performs operation of starting the vehicle system (such as, for example, ignition operation and operation of depressing a main switch). In other words, during this period, power is not supplied to most of the vehicle components.

If the passenger performs operation of starting the vehicle system (for example, operation of depressing the main switch while depressing a brake pedal), the power supply mode becomes a "normal mode". This mode is a mode for causing the vehicle to travel. On the other hand, in a case where it is desired to utilize only an electric component without causing the vehicle to travel, it is necessary to start the vehicle system in a power supply mode (accessory mode) in which power is supplied only to the accessory power supply system. Examples of such operation include, for example, "depressing the main switch without depressing the brake pedal". However, operation for powering on only the accessory power supply system is different from normal operation, and thus, there is a case where the user does not recognize the operation method.

Thus, in the present embodiment, a function for starting power supply to the accessory power supply system is also provided to the in-vehicle device 200.

Specifically, a configuration is employed where "in a case where predetermined operation is performed on the in-vehicle device while the vehicle system is stopped, power supply to the accessory power supply system of the vehicle is started".

FIG. 4B is a diagram for explaining transition of a power supply mode in the present embodiment. The in-vehicle device 200 (power supply management unit 2011) according to the present embodiment outputs a signal for supplying power to the accessory power supply system, in a case where operation is performed on the own device, and the vehicle starts power supply to the accessory power supply system, in response to this signal. This enables an electric component of the vehicle 10 to be utilized during a period until when operation of starting the vehicle system is performed. Note that in a case where operation for starting the vehicle system is performed, power is supplied to the accessory power supply system and the ignition power supply system as in related art.

Figure 5:
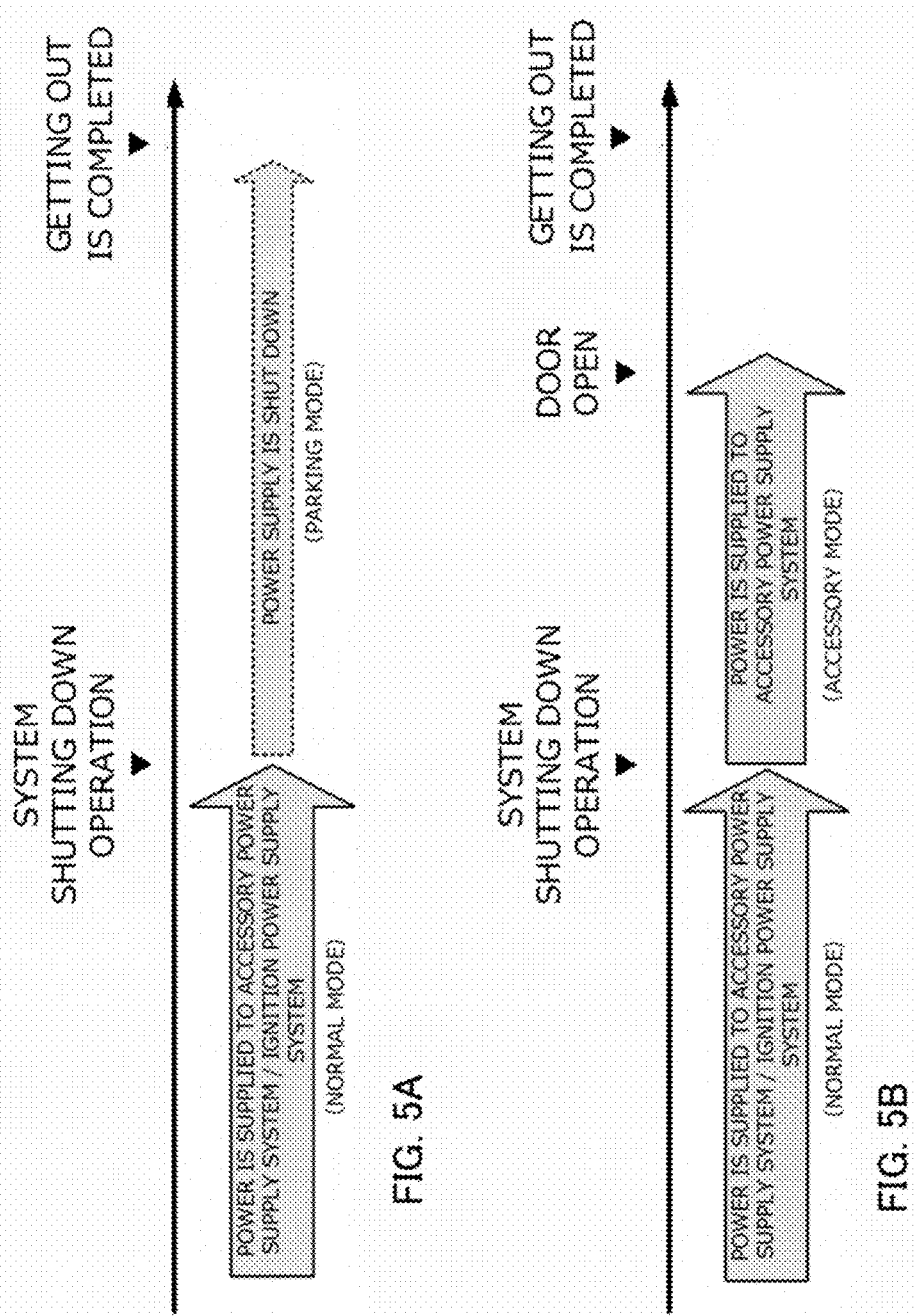
FIG. 5A is a diagram for explaining transition of the power supply mode upon getting-out.
FIG. 5B is a diagram for explaining transition of the power supply mode upon getting-out.

Further, the in-vehicle device 200 according to the present embodiment controls the accessory power supply system also when the passenger gets out of the vehicle. FIG. 5A is a diagram for explaining a power supply mode when the passenger gets out of the vehicle.

For example, if the passenger performs operation of shutting down the power supply of the vehicle system, the power supply mode transitions to a parking mode, and power supply to most of the vehicle components is stopped. Thus, the in-vehicle device 200 cannot be utilized during a period from when the vehicle system is stopped until when the passenger gets out of the vehicle. In other words, it is not possible to respond to the user's demand to enjoy entertainment and receive provision of information also after the vehicle system is stopped.

Thus, in the present embodiment, the in-vehicle device 200 performs control to maintain power supply to the accessory power supply system during a period from when operation of shutting down the power supply of the vehicle system is performed until when a trigger regarding getting-out of the passenger occurs.

FIG. 5B is a diagram for explaining transition of the power supply mode in the present embodiment. As illustrated, the in-vehicle device 200 (power supply management unit 2011) according to the present embodiment maintains power supply to the accessory power supply system also after the passenger performs operation of shutting down the power supply of the vehicle system. Power supply to the accessory power supply system continues until the passenger gets out of the vehicle. For example, a timing at which a door of the vehicle is open (or operation of locking the door of the vehicle is performed) can be set as the end of the period.

Note that the power supply management unit 2011 is constituted so as to be able to operate at low power by a power supply system (for example, a power supply system directly connected to a battery) different from the accessory power supply system. The in-vehicle device 200 can accept operation for powering on the accessory power supply system using the battery power supply and can output a signal for supplying power to the accessory power supply system even while the vehicle system is stopped. Note that operation of the function execution unit 2012 requires power supply from the accessory power supply system.

Returning to FIG. 3, description will be continued.

The function execution unit 2012 executes various kinds of functions to be provided by the in-vehicle device 200. Examples of the functions to be provided by the in-vehicle device 200 can include, for example, the following:

Terminal Link Function

This function is a function of connecting to a terminal (such as a smartphone) possessed by the passenger of the vehicle and reproducing music and a moving image, mirroring a screen, or the like.

Getting-Out Support Function

This function is a function of detecting another vehicle that approaches from behind the vehicle on the basis of sensor data outputted by the sensor provided in the vehicle 10 and outputting an alarm when the door is open. As the sensor, for example, a radar sensor, or the like, provided to face backward of the vehicle can be used.

Audio Function

This function is a function of reproducing music stored in the storage device.

TV/Radio Function

This function is a function of receiving radio broadcasting or digital TV broadcasting.

Navigation Function

This function is a function of providing route navigation on the basis of map data stored in the storage device.

These functions can be activated, for example, on the basis of operation with respect to the operation element 206 and the input/output device 204 (touch panel).

Returning to FIG. 2, description will be continued.

The storage device 202, which is a unit for storing information, is constituted with a storage medium such as a RAM, a magnetic disk and a flash memory. In the storage device 202, various kinds of programs to be executed at the control device 201, data to be utilized by the programs, and the like, are stored.

The CAN communication module 203 is a communication interface that connects the in-vehicle device 200 to a bus of the in-vehicle network.

The input/output device 204 is a unit for accepting input operation performed by the user and presenting information to the user. Specifically, the input/output device 204 is constituted with a touch panel and control unit thereof, and a liquid crystal display and control unit thereof. The touch panel and the liquid crystal display are constituted with one touch panel display in the present embodiment.

The input/output device 204 may include a unit (an amplifier or a speaker) that outputs audio, a unit (microphone) that inputs audio, and the like.

The wireless communication module 205 is a module that performs communication with a mobile terminal (such as a smartphone) possessed by the passenger of the vehicle. The wireless communication module 205 can perform communication by utilizing wireless communication standards such as, for example, Bluetooth (registered trademark) and Wi-Fi (registered trademark).

Figure 6:
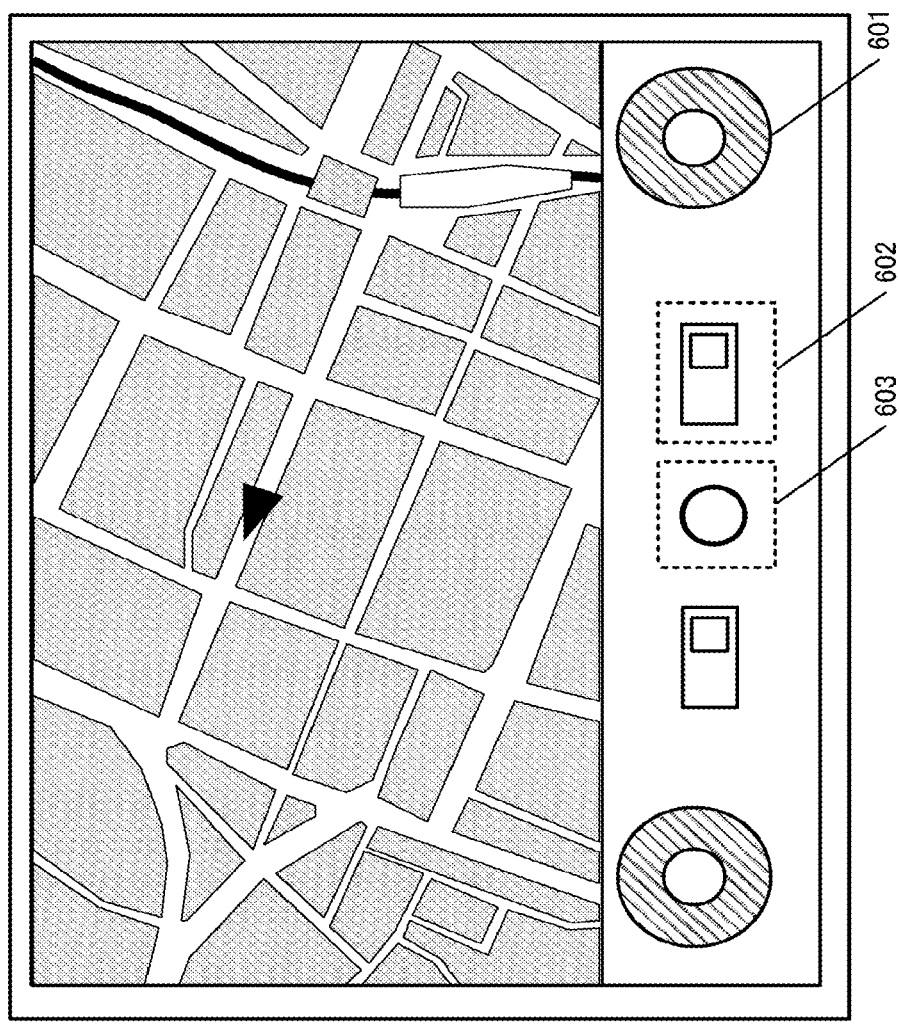
FIG. 6 is a view illustrating appearance of an in-vehicle device 200.

The operation element 206 is a hardware switch (physical switch) provided at the in-vehicle device 200. The in-vehicle device 200 according to the present embodiment can perform operation by utilizing the hardware switch in addition to a touch panel. The operation element 206 includes, for example, a keyboard, a cursor key, a rotary encoder, a linear encoder, and the like. FIG. 6 is a diagram for explaining arrangement of the operation element 206 and is a diagram of a panel provided at the in-vehicle device 200 viewed from the front.

A reference numeral 601 indicates a rotary selector that operates a dial type operation element in a circumferential direction. An encoder is connected to the selector so that an operation direction (rotation direction) and an amount of operation (for example, an angle of rotation and the number of clicks) can be acquired. According to the configuration, it is possible to smoothly change a value and move a cursor.

A reference numeral 602 indicates a toggle switch for switching a state between ON and OFF. By moving the switch, operation states of, for example, a defroster, a mirror heater, a steering heater, a seat heater, and the like, can be changed.

A reference numeral 603 indicates a switch of a combination of a rotary selector and a push switch. In the present embodiment, the reference numeral 603 indicates a switch (hereinafter, a function switch) that requests the in-vehicle device 200 to provide a predetermined function. For example, the function switch may be a switch that activates and terminates software that provides an audio/visual function. For example, if the function switch is depressed, software for performing music reproduction, video reproduction, reception of TV/radio, and the like, is activated.

Further, the function switch can notify the control device 201 of change of a value by being rotated in a circumferential direction. This enables the function switch to be utilized as, for example, an interface for adjusting a volume and an interface for selecting a function. It is, for example, possible to activate software that provides the audio/visual function by depressing the function switch and switch the function by subsequently rotating the function switch.

The operation element in the present disclosure corresponds to the switch indicated with the reference numeral 603.

The ECU 300 and peripheral components thereof will be described next.

The ECU 300 is an electronic control unit that controls components provided in the vehicle 10. The vehicle 10 may include a plurality of ECUs 300. The plurality of ECUs 300, for example, control components of different systems such as an engine system, an electrical system and a power train system. The ECU 300 has a function of generating a specified message and periodically transmitting/receiving the message via the in-vehicle network.

The ECU 300 can be constituted as a computer including a processor such as a CPU and a GPU, a main memory such as a RAM and a ROM, and an auxiliary memory such as an EPROM, a disk drive and a removable medium in a similar manner to the DCM 100.

The vehicle 10 according to the present embodiment includes a verification ECU 300A and a body ECU 300B.

The body ECU 300B is a computer that controls a body of the vehicle. The body ECU 300B has a function of locking and unlocking the door of the vehicle by controlling a door lock motor 303 which will be described later. Note that the body ECU 300B may further include a function of controlling elements associated with a vehicle body, such as power window control, seat adjustment, theft prevention, seat belt control and head light control. Further, the body ECU 300B can acquire an open/closed state of the door of the vehicle 10 via a door sensor 304 which will be described later.

The door lock motor 303 is an actuator that locks and unlocks the door (including a trunk as well as doors for getting-in and getting-out and a rear gate) of the vehicle 10. The door lock motor 303 operates on the basis of a signal transmitted from the body ECU 300B.

The door sensor 304 is a sensor that senses open/closed states of a plurality of doors of the vehicle 10.

The verification ECU 300A performs communication with a smart key (key fob) possessed by the passenger of the vehicle and determines whether a person who has legitimate authority tries to get in the vehicle. A main switch 301 and a transmitter/receiver 302 are connected to the verification ECU 300A.

The main switch 301 is a hardware switch for starting the vehicle system and is typically a push switch. The main switch 301 is also referred to as an ignition switch.

The transmitter/receiver 302 includes a unit for receiving a radio wave in a high frequency band (RF band) transmitted from the smart key and a unit for transmitting a radio wave in a low frequency band (LF band) for searching for the smart key (performing polling). The RF band is, for example, a frequency from 100 MHz to 1 GHZ. Further, the LF band is, for example, a frequency from 100 KHz to 300 KHz. The unit for receiving a radio wave in the RF band is incorporated at any location within a vehicle interior. Further, the unit for transmitting a radio wave in the LF band is, for example, incorporated in the vicinity of a center console or a steering within the vehicle interior.

In a case where the smart key transmits a signal for locking/unlocking the door of the vehicle (locking/unlocking signal), the verification ECU 300A receives the locking/unlocking signal via the transmitter/receiver 302 and performs authentication. Specifically, the verification ECU 300A determines whether or not a key ID included in the locking/unlocking signal matches a key ID stored in advance in the verification ECU 300A. In a case where authentication is successful, the verification ECU 300A transmits a signal for locking or unlocking the door to the body ECU 200B in accordance with the locking/unlocking signal.

Further, in a case where a locking/unlocking switch provided at the door of the vehicle 10 is depressed, the verification ECU 300A confirms existence of a key by performing polling via the transmitter/receiver 302 and performs authentication. In a case where authentication is successful, the verification ECU 300A transmits a signal for locking or unlocking the door to the body ECU 200B.

In a case where the main switch 301 is depressed, the verification ECU 300A confirms existence of a key by performing polling via the transmitter/receiver 302 and performs authentication. In a case where authentication is successful, the verification ECU 300A transmits a signal that gives an instruction to start the system to ECUs (such as an engine ECU and a hybrid ECU, hereinafter referred to as "main ECU") that manages a traveling system. By this means, starting of a hybrid system, starting of the engine, and the like, are performed.

The network bus is a communication bus that constitutes the in-vehicle network. Note that while one bus is illustrated in this example, the vehicle 10 may include two or more communication buses. The plurality of communication buses may be connected to each other by the DCM 100 or a gateway that puts the plurality of communication buses together.

Figure 7:
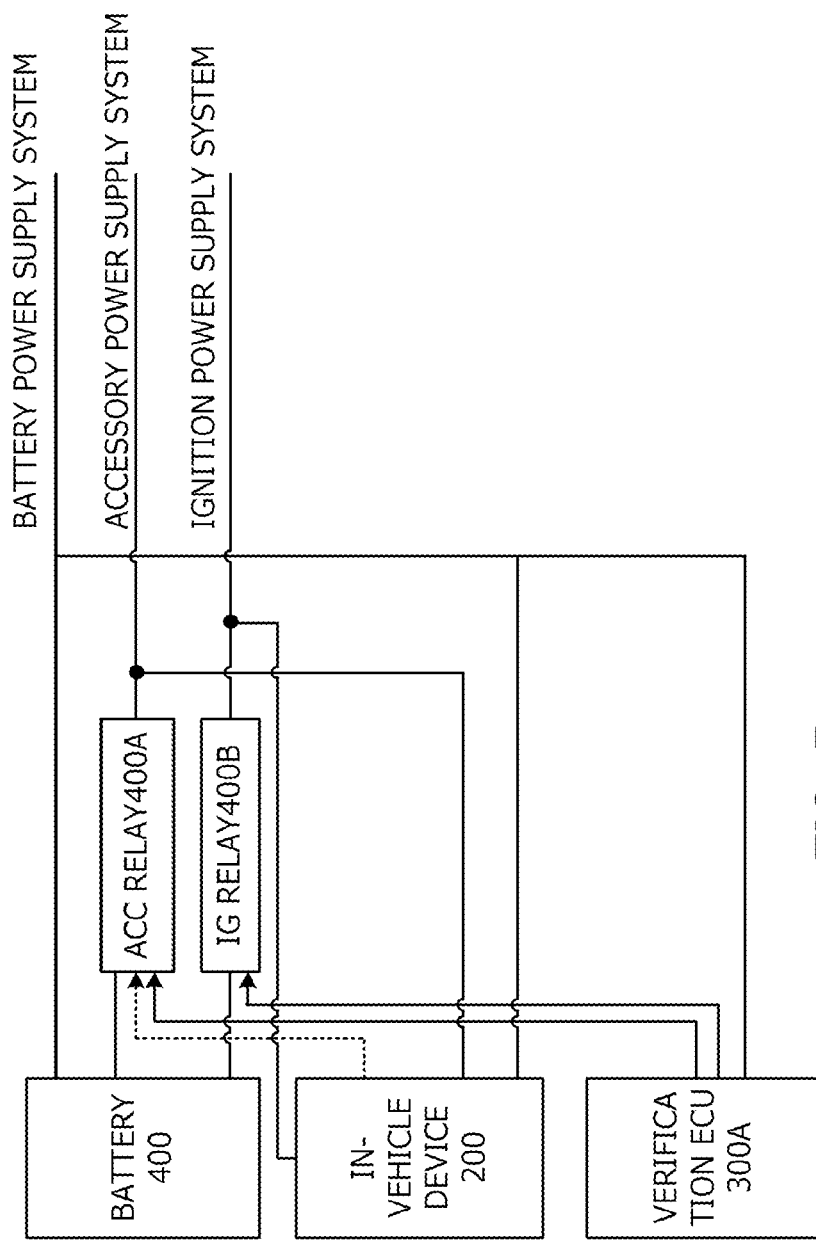
FIG. 7 is a diagram for explaining a circuit for supplying power.

A method in which the in-vehicle device 200 (power supply management unit 2011) controls the accessory power supply system will be described next. FIG. 7 is a diagram illustrating a plurality of power supply systems provided at the vehicle 10 and a configuration for applying voltages to these power supply systems.

The vehicle 10 includes three power supply systems of the battery power supply system, the accessory power supply system and the ignition power supply system. All the systems receive power supply from the battery 400 mounted on the vehicle 10.

The battery power supply system is a system in which power is constantly supplied from the battery 400.

The accessory power supply system is a system in which power is supplied in a case where the power supply mode is the accessory mode or the normal mode. Power supply to the accessory power supply system is controlled by an ACC relay 400A.

The ignition power supply system is a system in which power is supplied in a case where the power supply mode is the normal mode. Power supply to the ignition power supply system is controlled by an IG relay 400B.

A method for controlling the ACC relay 400A and the IG relay 400B will be described.

As described above, the verification ECU 300A determines whether a person who has legitimate authority tries to get in the vehicle. In a case where the main switch 301 is depressed, the verification ECU 300A authenticates a smart key through wireless communication and in a case where authentication is successful, switches the power supply mode to one of the accessory mode and the normal mode.

In a case where the power supply mode is switched to the accessory mode, the verification ECU 300A supplies an operation signal to the ACC relay 400A and causes the relay to operate. By this means, power is supplied to the accessory power supply system from the battery.

In a case where the power supply mode is switched to the normal mode, the verification ECU 300A supplies an operation signal to both the ACC relay 400A and the IG relay 400B and causes these relays to operate. By this means, power is supplied to the accessory power supply system and the ignition power supply system from the battery.

These kinds of operation are operation in the vehicle according to related art.

On the other hand, in the present embodiment, as indicated with a dotted line in the drawing, the in-vehicle device 200 can supply an operation signal to the ACC relay 400A.

In a case where operation is performed on the operation element 206, the in-vehicle device 200 supplies an operation signal to the ACC relay 400A and causes the relay to operate. This enables power to be supplied to the accessory power supply system in response to the operation performed on the in-vehicle device 200. Note that detection of the operation performed on the operation element 206 and output of the operation signal can be performed by the battery power supply system at low power.

Processing to be performed by the in-vehicle device 200 and the verification ECU 300A will be described next.

Figure 8:
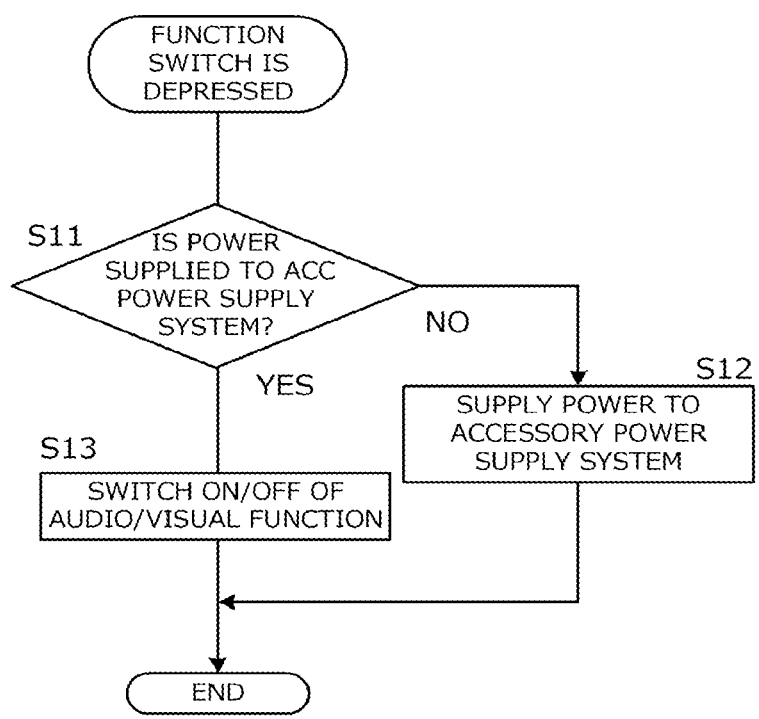
FIG. 8 is a flowchart of processing to be executed by the in-vehicle device 200.

FIG. 8 is a flowchart of processing to be executed by the in-vehicle device 200 (power supply management unit 2011). The illustrated processing is started in a case where the operation element 206 (function switch) is depressed.

First, in step S11, it is determined whether or not power is supplied to the accessory power supply system provided in the vehicle 10. In a case where power is supplied from the accessory power supply system to the in-vehicle device 200, a positive determination result is obtained in the present step. In a case where the in-vehicle device 200 operates not with power from the accessory power supply system, but with power from the battery power supply system, a negative determination result is obtained in the present step.

In step S12, an operation signal is supplied to the ACC relay 400A to cause the relay to operate. By this means, power is supplied to the accessory power supply system. If power is supplied from the accessory power supply system to the in-vehicle device 200, the function execution unit 2012 can operate, so that various kinds of functions can be provided.

In a case where the function switch is depressed in a state where power is currently supplied to the accessory power supply system of the vehicle, the processing transitions to step S13, and the in-vehicle device 200 switches ON and OFF of the predetermined function (for example, the audio/visual function).

Figure 9:
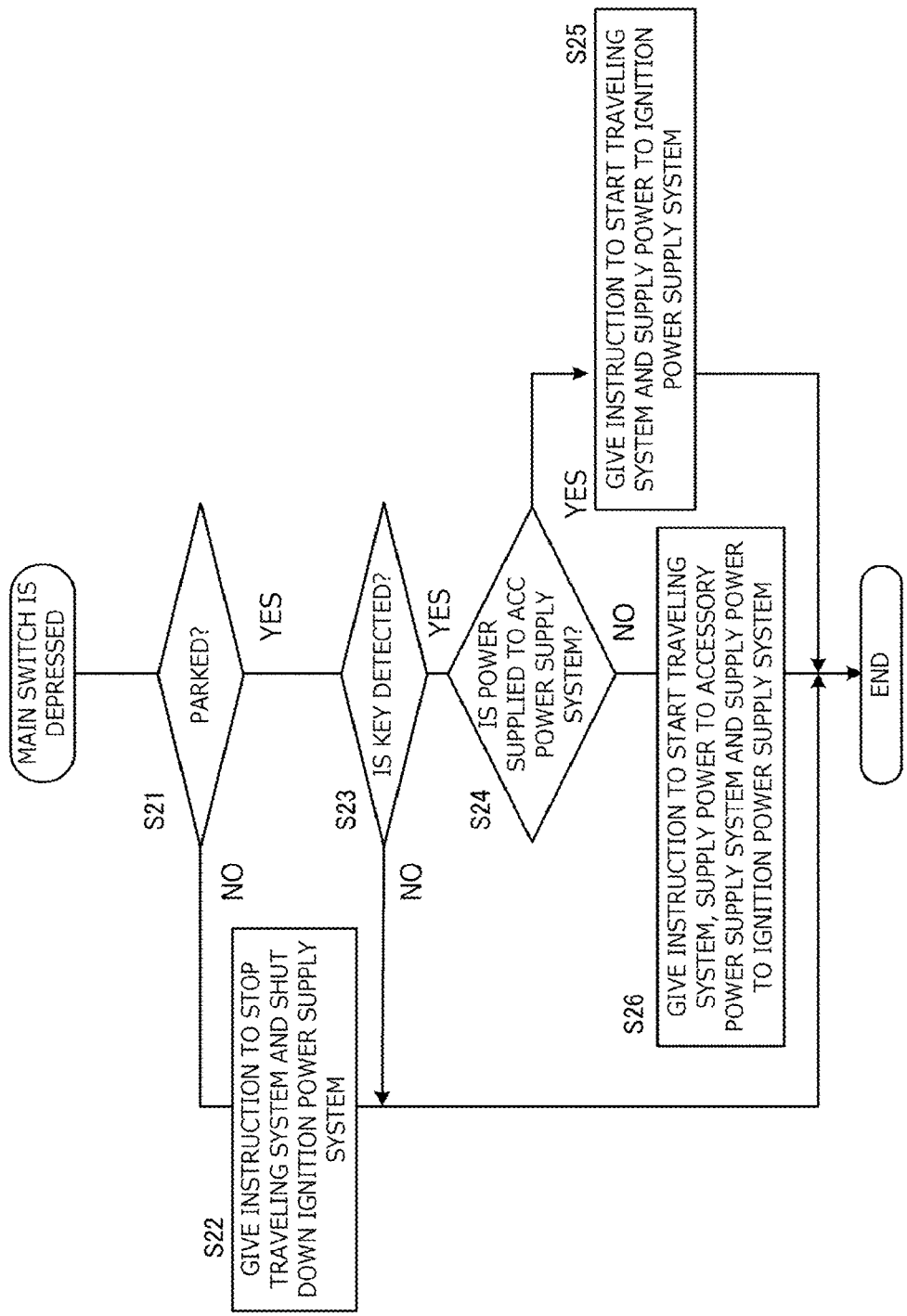
FIG. 9 is a flowchart of processing to be executed by a verification ECU 300A.

FIG. 9 is a flowchart of processing to be executed by the verification ECU 300A in a case where the main switch 301 is depressed.

First, in step S21, it is determined whether the vehicle 10 is parked (that is, whether the vehicle system is stopped). In a case where a negative determination result is obtained in the present step (that is, in a case where the vehicle system is running), the processing transitions to step S22.

In step S22, the main ECU that manages the traveling system is instructed to shut down the traveling system, and supply of the operation signal to the IG relay 400B is stopped. By this means, the ignition power supply system is shut down.

Note that in the present step, the verification ECU 300A also stops supply of the operation signal to the ACC relay 400A. However, in a case where the in-vehicle device 200 is being used, the operation signal is supplied from the in-vehicle device 200 to the ACC relay 400A, which results in power supply to the accessory power supply system being maintained. Power supply to the accessory power supply system is continued until the passenger gets out of the vehicle (which will be described later).

In a case where a positive determination result is obtained in step S21, the processing transitions to step S23.

In step S23, it is determined whether or not the verification ECU 300A detects a smart key within the vehicle. In a case where a smart key is not detected within the vehicle, the processing is finished. In a case where a smart key is detected within the vehicle, the processing transitions to step S24.

In step S24, it is determined whether or not power is supplied to the accessory power supply system. In a case where power is supplied from the accessory power supply system to the verification ECU 300A, a positive determination result is obtained in the present step, and the processing transitions to step S25. In a case where the verification ECU 300A operates not with power from the accessory power supply system, but with power from the battery power supply system, a negative determination result is obtained, and the processing transitions to step S26.

A case where the processing transitions to step S25 is a case where the main switch 301 is depressed under a condition where power is supplied to the accessory power supply system. In such a case, the verification ECU 300A instructs the main ECU to start the traveling system, and at the same time, supplies an operation signal to the IG relay 400B. By this means, power supply to the ignition power supply system is started.

A case where the processing transitions to step S26 is a case where the main switch 301 is depressed under a condition where power is not supplied to the accessory power supply system. In such a case, the verification ECU 300A instructs the main ECU to start the traveling system. Further, at the same time, the verification ECU 300A supplies an operation signal to the ACC relay 400A and the IG relay 400B. By this means, power supply to the accessory power supply system and the ignition power supply system is started.

On the other hand, the in-vehicle device 200 continues measures for supplying power to the accessory power supply system (in other words, continues supply of the operation signal to the ACC relay 400A) during a period while a predetermined function is running. Supply of the operation signal continues until the function switch is depressed (to stop the function of the in-vehicle device 200) or the passenger gets out of the vehicle.

Figure 10:
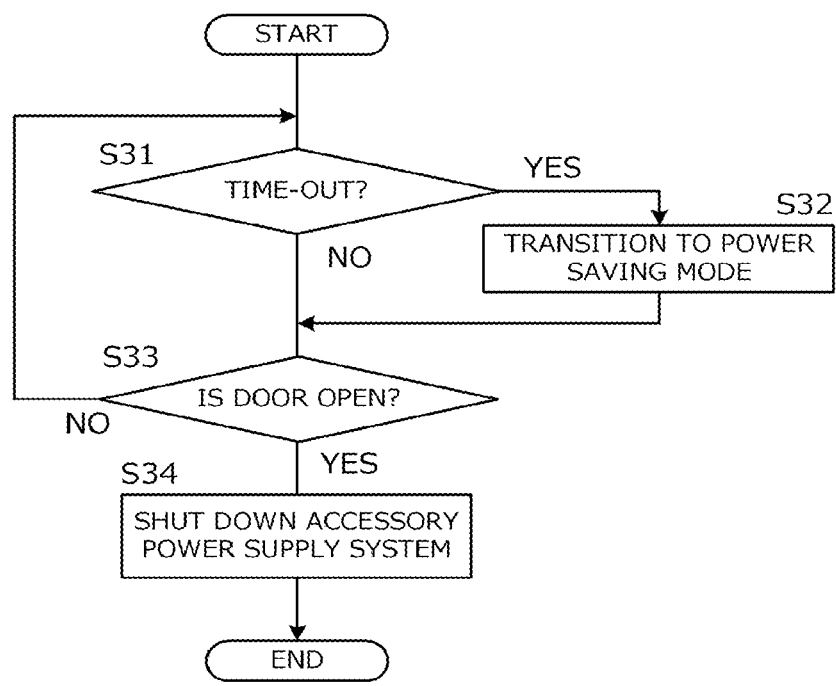
FIG. 10 is a flowchart of processing to be executed by the in-vehicle device 200.

FIG. 10 is a flowchart of processing to be executed by the in-vehicle device 200 (power supply management unit 2011) under a condition where power is supplied only to the accessory power supply system.

In step S31, it is determined whether or not a predetermined period (for example, three minutes) has elapsed in a state where power is supplied only to the accessory power supply system. In a case where a positive determination result is obtained in the present step, the processing transitions to step S32, and the mode transitions to a power saving mode. The power saving mode is a mode for reducing power consumption. In the power saving mode, for example, the accessory power supply system is shut down, because in a case a fixed period has elapsed in a state where power is supplied only to the accessory power supply system, it is preferable to stop power supply to the accessory power supply to reduce power consumption of the battery.

In step S33, it is determined whether or not the door of the vehicle is open. Whether or not the door of the vehicle is open can be determined on the basis of a door open/closed signal output by the body ECU 300B. In a case where a positive determination result is obtained in the present step, the processing transitions to step S34. In a case where a negative determination result is obtained, the processing returns to step S31.

In step S34, supply of the operation signal to the ACC relay 400A is stopped. By this means, power supply to the accessory power supply system is terminated.

As described above, the in-vehicle device 200 according to the present embodiment can supply a signal for supplying power to the accessory power supply system of the vehicle, to the ACC relay 400A without using the main switch 301. This enables the passenger of the vehicle to power on the accessory power supply system of the vehicle only through operation of depressing a switch provided at the in-vehicle device 200. For example, the passenger of the vehicle can power on the accessory power supply system only by depressing a switch for activating the audio/visual function of the in-vehicle device 200, so that the passenger can perform intuitive operation.

Modification of First Embodiment

While in the first embodiment, it is determined that the passenger gets out of the vehicle in a case where the door of the vehicle 10 is open, getting-out of the passenger may be detected using other methods. For example, the passenger having got off the vehicle or the passenger trying to get out of the vehicle may be detected by a sensor, a camera, or the like. Further, in a case where the door of the vehicle 10 has been locked, it may be determined that the passenger has got off the vehicle.

Other Modifications

The above-described embodiment is merely an example, and the present disclosure can be changed and implemented as appropriate within a scope not deviating from the gist of the present disclosure.

For example, the processing and the units described in the present disclosure can be freely combined and implemented unless technical inconsistency occurs.

In addition, the processing described as being performed by one device may be shared and executed by a plurality of devices. Alternatively, the processing described as being performed by different devices may be executed by one device. In a computer system, what hardware configuration (server configuration) realizes each function can be flexibly changed.

The present disclosure can also be realized by supplying a computer program including the functions described in the above embodiments to a computer and causing one or more processors included in the computer to read and execute the program. Such a computer program may be provided to the computer by a non-transitory computer-readable storage medium connectable to a system bus of the computer, or may be provided to the computer via a network. Examples of non-transitory computer readable storage media include: any type of disk such as a magnetic disk (floppy (registered trademark) disk, hard disk drive (HDD), etc.), an optical disk (CD-ROM, DVD disk, Blu-ray disk, etc.); and any type of medium suitable for storing electronic instructions, such as read-only memory (ROM), random access memory (RAM), EPROM, EEPROM, magnetic cards, flash memory, and optical cards.

What is claimed is:

1. An in-vehicle device that provides a predetermined function to a passenger of a vehicle, the in-vehicle device comprising:
   an ignition switch that starts a vehicle;
   an operation element that is a hardware interface; and
   a controller comprising at least one processor configured to:
      determine a condition is met when the ignition switch is on, the vehicle is in park, and communication with a smart key is detected,
      when the condition is met, output a first signal to operate a first relay to supply power to an accessory power supply system of the vehicle, thereby supplying power to the predetermined function, and output a second signal to operate a second relay to supply power to an ignition power supply system of the vehicle,
      when the ignition switch is off, output a third signal to operate the first relay when operation is performed on the operation element of the in-vehicle device, and
      stop outputting the third signal to the first relay when a door of the vehicle is opened.

2. The in-vehicle device according to claim 1, wherein the operation element is a button for requesting provision of the predetermined function.

3. The in-vehicle device according to claim 1, wherein the predetermined function includes at least an audio function.

4. The in-vehicle device according to claim 1, wherein in a case where power is currently supplied to the accessory power supply system of the vehicle and operation is performed on the operation element, the controller provides the predetermined function.

5. The in-vehicle device according to claim 4, wherein in a case where operation is performed on the operation element while the predetermined function is provided, the controller terminates provision of the predetermined function.

6. The in-vehicle device according to claim 4, wherein the controller provides the predetermined function using the power from the accessory power supply system.

7. The in-vehicle device according to claim 1,
   wherein in a case where power is not supplied to the accessory power supply system of the vehicle and operation is performed on the operation element, the controller outputs the third signal, and
   in a case where power is currently supplied to the accessory power supply system of the vehicle and operation is performed on the operation element, the controller provides the predetermined function.

8. A control method for controlling a vehicle, the control method comprising:
   acquiring operation of an operation element provided at an in-vehicle device, the operation element being a hardware interface, the in-vehicle device providing a predetermined function to a passenger of the vehicle;
   determining a condition is met when an ignition switch is on, the vehicle is in park, and communication with a smart key is detected;
   when the condition is met, outputting a first signal to operate a first relay to supply power to an accessory power supply system of the vehicle, thereby supplying power to the predetermined function, and outputting a second signal to operate a second relay to supply power to an ignition power supply system of the vehicle;
   when the ignition switch is off, outputting a third signal to operate the first relay when the operation is performed on the operation element of the in-vehicle device; and
   stopping the outputting the third signal to the first relay when a door of the vehicle is opened.

9. The control method according to claim 8, wherein the operation element is a button for requesting provision of the predetermined function.

10. The control method according to claim 8, wherein the predetermined function includes at least an audio function.

11. The control method according to claim 8, wherein in a case where power is currently supplied to the accessory power supply system of the vehicle and operation is performed on the operation element, the predetermined function is provided.

12. The control method according to claim 11, wherein in a case where operation is performed on the operation element while the predetermined function is provided, provision of the predetermined function is terminated.

13. The control method according to claim 11, wherein the predetermined function is provided using power from the accessory power supply system.

14. The control method according to claim 8,
   wherein in a case where power is not supplied to the accessory power supply system of the vehicle and operation is performed on the operation element, the third signal is output, and
   in a case where power is currently supplied to the accessory power supply system of the vehicle and operation is performed on the operation element, the predetermined function is provided.

* * * * *